United States Patent [19]

Shivers, Jr.

[11] Patent Number: 5,067,667
[45] Date of Patent: Nov. 26, 1991

[54] AIRCRAFT OPTIMIZATION INDICIA AND THE USE THEREOF

[76] Inventor: Charles B. Shivers, Jr., 816 S. 82nd St., Birmingham, Ala. 35203

[21] Appl. No.: 556,829

[22] Filed: Jul. 23, 1990

[51] Int. Cl.⁵ .................. G01C 21/00; G01D 13/24
[52] U.S. Cl. .............................. 244/1 R; 73/178 T; 116/296
[58] Field of Search .............. 244/1 R, 121, 53 R, 244/76 R; 73/178 R, 178 T, 179, 178 H; 340/967, 968, 974, 966, 973; 116/DIG. 43, DIG. 46, DIG. 47, 296, 334, 335; 33/328

[56] References Cited

U.S. PATENT DOCUMENTS

| | | | |
|---|---|---|---|
| 3,106,903 | 10/1963 | Bentkosky et al. | 33/328 |
| 3,679,297 | 7/1972 | Searle et al. | 73/178 R |
| 4,060,793 | 11/1977 | Bateman | 340/945 |
| 4,092,191 | 5/1978 | Jones | 116/DIG. 47 |
| 4,281,811 | 8/1981 | Nixon | 340/945 |
| 4,368,517 | 1/1983 | Lovering | 73/178 T |
| 4,380,963 | 4/1983 | Berney | 116/296 |
| 4,583,094 | 4/1986 | Mosier | 340/973 |
| 4,786,905 | 11/1988 | Muller | 340/968 |

Primary Examiner—Sherman Basinger
Assistant Examiner—Virna Lissi Mojica
Attorney, Agent, or Firm—Jennings, Carter, Thompson & Veal

[57] ABSTRACT

An aircraft flight dynamics indicator utilize an artificial horizon and a plurality of indicators to establish climb and descent indexes wherein safe flight may be maintained during ascent and descent by cuing aircraft attitude to a visibly perceptive change in aircraft motion related to the pitch at a given air speed.

12 Claims, 2 Drawing Sheets

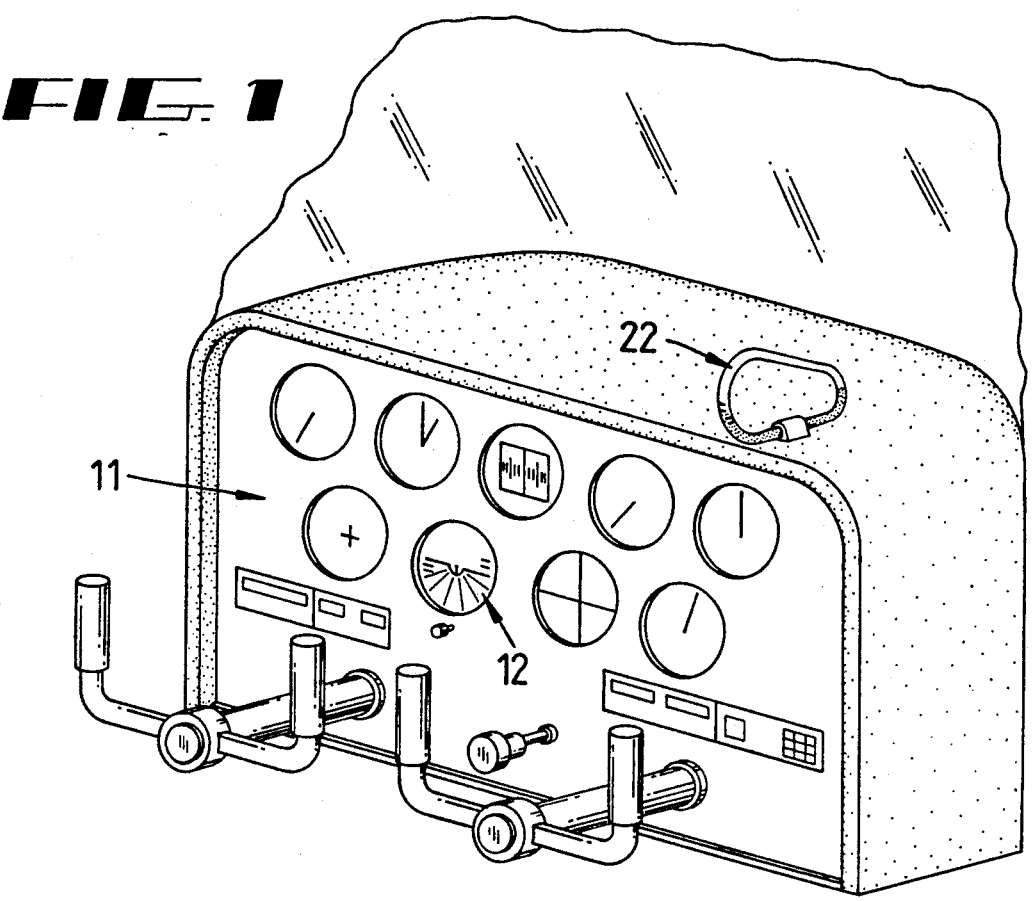
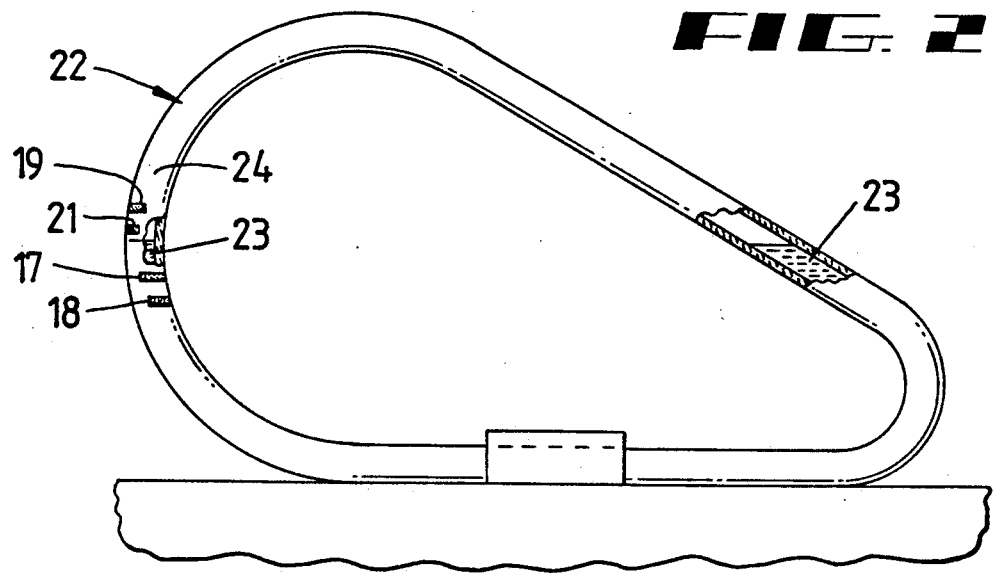

AIRCRAFT OPTIMIZATION INDICIA AND THE USE THEREOF

FIELD OF THE INVENTION

The present invention relates to aircraft instrumentation and more particularly to instrumentation which allows a pilot to optimize his flight parameter during take off, landing, and flight More particularly, the present invention relates to aircraft specific indicia which will enable the pilot to establish such parameters as best rate and angle of climb, maximum endurance profile, maximum range profile; and maximum glide profile

BACKGROUND OF THE INVENTION

Modern aviation is highly instrument oriented and in the more complex aircraft the control of the aircraft can be almost completely automated While such automation is highly advantageous in certain circumstances it is not always the proper manner in which an aircraft should be controlled. In less complex aircraft such as flown by private pilots such automation features are the exception rather than the norm. In either environment, there are certain critical parameters which must be gauged and considered in maintaining safe flight and more importantly safe landings. One notable problem area is aircraft control during landing.

It is the object of the present invention to enable any pilot of any aircraft to skillfully transition between the earth and the ether at proper speeds and pitch attitudes.

Yet another object of the invention is to provide a simple indicia which enables the pilot to maintain a maximum range or a maximum endurance profile.

My invention is essentially an improvement to the pitch indicator found in the aircraft, which improvement further enhances an improvement of the pilots understanding of his aircraft.

My invention requires the pilot to first be observant of a particular transition phenomenon that occurs as the pitch of the aircraft is varied for a given power setting. As the nose up pitch is increased, the observant pilot will note that the aircraft's perceived forward motion over the ground will stop and the aircraft will appear to begin to sink or mush. The pilot must identify the "threshold of sink" and adjust or position an indicia thereof in the pitch indicator. A second indicia is positioned proximal the pitch indicator to indicate stall attitude. When these indicia are positioned during a full throttle climb, they define a climb index and flight at or near the threshold of sink indicia yields the best rate of climb for the aircraft. When the indicia are positioned during a power off glide they define a flight index which can be used to achieve a minimum sink profile or a maximum glide profile.

In the practice of the invention, a standard artificial horizon indicator may be used or a simple hydraulic pitch indicator may be used with the indicia.

BRIEF DESCRIPTION OF THE DRAWINGS

Apparatus embodying features of my invention are depicted in the accompanying drawings which form a portion of this disclosure and wherein.

FIG. 1 is a partial perspective view of the cockpit of an aircraft showing the control panel with both embodiments of my invention illustrated.

FIG. 2 is a side elevational view of a hydraulic attitude indicator utilizing my indicia.

DESCRIPTION OF THE PREFERRED EMBODIMENTS

Figure 3:
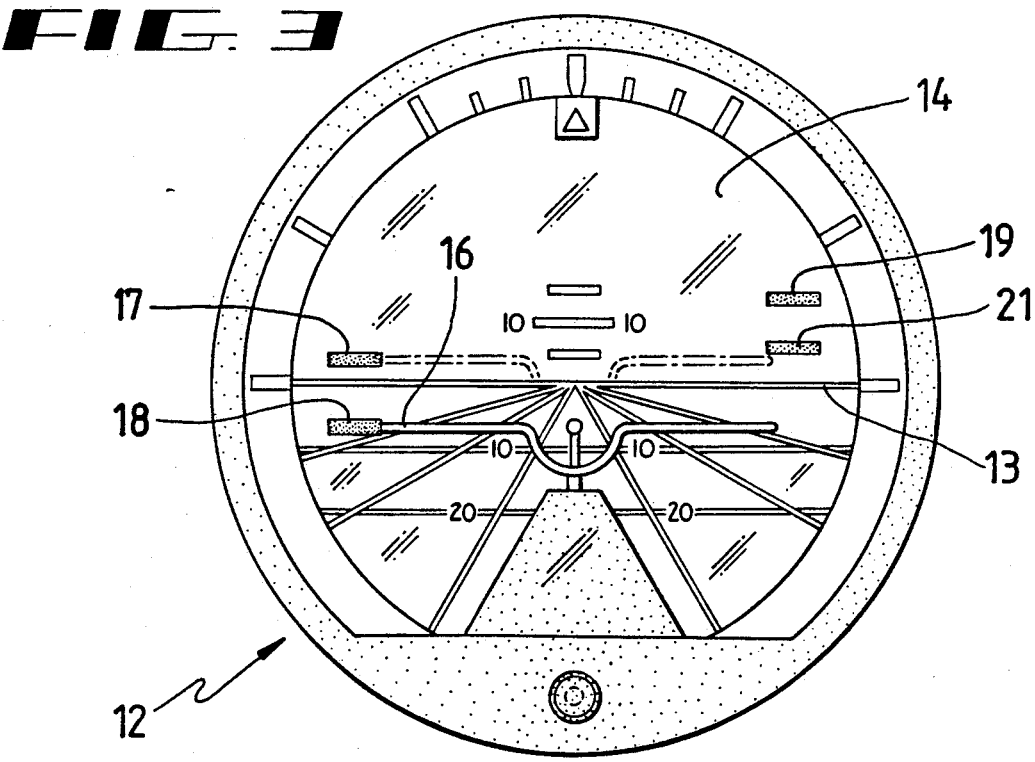
FIG. 3 is an elevational view of an artificial horizon indicator incorporating my invention and showing the use thereof with the climb index.

Referring to the drawings for a clearer understanding of my invention, it will be seen in FIG. 1 that I have depicted a simple instrument panel 11 for an aircraft. In as much as the instrumentation may vary from aircraft to aircraft, no discussion of the various instruments will be undertaken except for the artificial horizon indicator 12, shown in the center of the instrument panel. The artificial horizon indicator 11 is familiar to all pilots and may be sometime referred to as a pitch indicator, however, as well known it functions to give the pilot a visual representation of the aircraft relative to the earth, indicating to the pilot a nose up or nose down condition as well as a wing up or down condition. It is through the modifications of such a device that my improvement in aviation safety is partially or in some instances facilitated. I have determined a range of pitch attitudes within which any aircraft may be properly and safely flown in climb, descent, or level flight independently of the remaining instrumentation of the aircraft and I can adapt the attitude indicator 12 to visually represent these ranges.

Although my method and apparatus are not aircraft specific in its application, it is aircraft and pilot dependent and relies on the pilots ability to recognize visual cues associated with aircraft control. One such visual cue which must be perceived by the pilot is the "threshold of sink". That is to say, in the various modes of aircraft operation, such as climb, or descent, there occurs at a given throttle setting a change in the apparent motion of the aircraft relative to the horizon which is associated with a transition in the attitude of the aircraft. That is to say that for a given throttle setting as the nose of the aircraft is raised or lowered, the apparent motion of the aircraft will change from horizontal to vertical and vice versa. At the attitude and throttle setting coincident with the change is the point of flight dynamics which I call the "threshold of sink" and which must be perceived by the pilot for him to utilize my invention.

Figure 4:
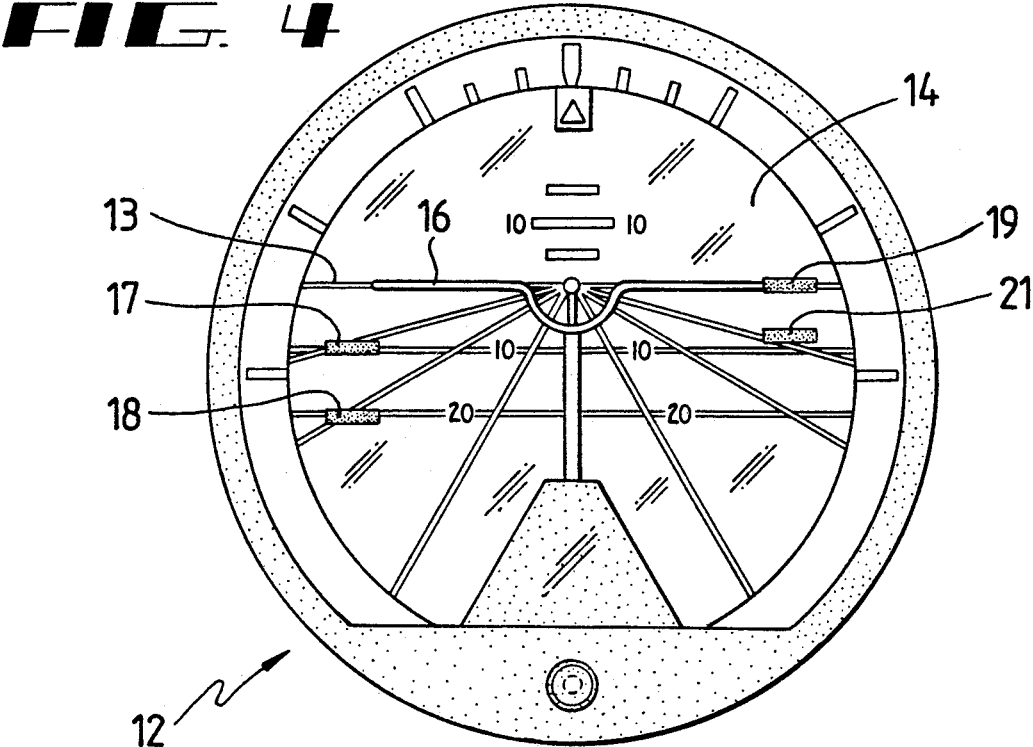
FIG. 4 is similar to FIG. 3 and illustrates alignment of the artificial horizon indicator with the threshold of sink for power off glide.

With reference to FIGS. 3 and 4, one may understand how my modification to the indicator works. Note that the indicator includes a movable artificial horizon 13 mounted on a suspended sphere within the beveled cover 14 of the instrument. An aircraft indicator 16 is adjustably mounted to the instrument and has a fixed relation to the aircraft body. Thus the artificial horizon is movable relative to the aircraft indicator 16 concomitantly with the motion of the aircraft relative to the actual horizon. Thus as the nose of the aircraft rises the artificial horizon 13 descends relative to the aircraft indicator 16. My invention enables the pilot to identify on his attitude indicator an acceptable range within which he should keep the artificial horizon relative to the aircraft indicator to insure safe flight for a given power setting.

One set of indicia used to denote a safe operating range is the climb index and is utilized in a climb configuration with a wide open throttle. With a wide open throttle and a climb aircraft configuration the pilot should raise the nose of the aircraft until he observes the threshold of sink relative to the actual horizon appearing over the nose of his aircraft. Upon assuring himself that this transition point has been reached, he should place a colored indicator strip 17 on the cove 14 of the instrument coincident with the position of the artificial horizon at the perceived threshold of sink. Further, back pressure on the stick yields a further nose up attitude until stall is reached. This attitude should be marked on the cover 14 by a second colored indicia 18 placed coincident with the position of the artificial horizon indicator 13 at the onset of stall. In FIG. 3, it is seen that the aircraft indicator is set coincident with indicia 18, thus the pilot must maintain horizon above the horizontal extension of the indicator 16 to maintain a safe climb attitude. To obtain his best rate of climb the pilot should maintain the horizon coincident with indicia 17. Thus in actual practice the aircraft indicia or pitch index should be set to indicia 17 and the horizon 14 should be matched thereto during climb. If the best angle of climb, Vx, is desired, the pitch indicator 16 should be set to the midpoint between indicia 17 and 18 and the horizon should be matched thereto during the climb.

The descent index is located on the attitude indicator 11 in a similar manner. The pilot must establish a power off glide and then determine the threshold of sink pitch attitude. An indicia strip 19 should be positioned on the cover 14 of the attitude indicator 12 coincident with the position of the artificial horizon 14 at the threshold of sink. Note that the pitch angle is different for different throttle settings and flight configurations, thus the indicia defining the climb index are positioned on one side of the attitude indicator 12 while the indicia defining the descent index are placed on the opposite side of the attitude indicator is shown in FIG. 3 and 4. After establishing the threshold of sink indicia 19 on the instrument, the pilot should further raise the nose of the aircraft to the stall point and similarly mark the position of the artificial horizon 14 with an indicia 21. With the descent index established it can be seen that the pilot may safely conduct his approach by maintaining the artificial horizon above the stall indicia 21. Note that the minimum sink attitude or short field approach attitude will coincide with the midpoint between the indicia 19 and 21. It will further be appreciated that the indicia 17, 18, 19, and 21 may be color coded with 18 and 21 preferably being a warning color, such as red.

In FIG. 2, I have depicted a simple alternative embodiment of my invention wherein a clear tubular loop 22 is mounted to the aircraft and contains a volume of a colored liquid 23, such as water, such that the forward level 24 of the liquid 23 is used as my artificial horizon. Using the same procedure as outlined above with references to the conventional attitude indicator 12 indicia 17, 18, 19, and 21 are positioned on the loop 22 to define my climb and descent indexes. The indicia may be formed by reusable colored tape strings which are easily affixed to either the conventional attitude indicator 12 or to the loop 22.

While I have shown my invention in two forms, it will be obvious to those skilled in the art that it is not so limited but is susceptible of various changes and modifications without departing from the spirit thereon.

What I claim is:

1. Apparatus for providing visual cues to an aviator in an aircraft to indicate proper pitch values in descent and ascent comprising, in combination with an artificial horizon indicator:

(a) first indicating means detachably affixable proximal said artificial horizon indicia for indicating pitch at zero sink perceived by the aviator in a power off glide;
(b) second indicating means detachably affixable proximal said artificial horizon indicia for indicating pitch at stall in a power off glide; such that said aviator may adjust the power supplied to his aircraft to maintain level flight with said artificial horizon indicia aligned with said first means to achieve maximum range or with said artificial horizon indicia centered between said first and second means to achieve maximum endurance.

2. Apparatus as defined in claim 1 further comprising:
(a) third indicating means detachably affixed proximal said artificial horizon indicia for indicating pitch at the aviators perceived onset of sink in a full power ascent; and
(b) fourth indicating means detachably affixed proximal said artificial horizon indicia to indicate the stall speed in a full power ascent, wherein said aviator may adjust the angle attitude of the aircraft to cause the artificial horizon indicia to coincide with said third means to obtain the best rate of climb.

3. Apparatus as defined in claim 2 wherein said first indicating means and said third indicating means are detachable strips of material each having a distinct color, and said second indicating means and said fourth indicating means are detachable strips of an alarm indicating color.

4. In combination with an indicating means responsive to the pitch of an aircraft to indicate the same to an occupant thereof a set of indicia for indicating a safe operating range during climb and descent of the aircraft including a first color coded indicia detachably affixed on said indicating means to coincide with aircraft pitch at the threshold of perceived sink of the aircraft during climb at full throttle, a second color coded indicia detachably affixed on said indicating means to coincide with the aircraft pitch at a full throttle stall, and first and second color coded indicia forming a climb index on said indicating means; a third color coded indicia detachably affixed on said indicating means to coincide with aircraft pitch at the threshold of perceived sink in a power off glide and a fourth color coded indicia detachably affixed on said indicating means to coincide with aircraft pitch at a power off stall, and third and forth indicia forming a descent index on said indicating means.

5. The indicia as defined in claim 1 wherein said first coded indicia has a distinct first color; said second color coded indicia having a distinct second color; said third color coded indicia being of a third distinct color and said fourth color coded indicia being of the same color as said second color coded indicia.

6. The combination as defined in claim 4 wherein said indicating means is an artificial horizon indicator.

7. The combination as defined in claim 4 wherein said indicating means is a hollow tube formed into a closed loop and containing a quantity of a visible liquid with said loop being transparent over a portion thereof such that the level of said liquid may be observed.

8. The combination as defined in claim 3 wherein said first, second, third, and fourth indicia are colored adhesive strips which can be detachably affixed to said tube.

9. A method of optimizing performance of an aircraft having indicating means responsive to the pitch thereof to indicate the same to an occupant thereof comprising: establishing a power off glide in said aircraft at a safe attitude; increasing the nose up pitch of said aircraft until the perceived horizontal motion of said aircraft changes to a perceived vertical motion relative to the horizon; decreasing pitch and identifying the pitch at which horizontal motion is perceived to identify a threshold of sink pitch attitude, placing a first color coded detachably affixable indicia proximal said indicating means to identify the threshold of sink pitch attitude; adjusting the pitch of said aircraft to create a power off stall; placing a second color coded detachably affixable indicia proximal said indicating means to identify the stall attitude said first and second indicia forming a flight index; adjusting the power to said aircraft to maintain level flight while maintaining said indicating means within said flight index.

10. The method as defined in claim 9 wherein said aircraft is maintained at said threshold of sink pitch attitude during level flight to obtain maximum range.

11. The method as defined in claim 9 wherein said aircraft is maintained at a pitch attitude corresponding to the midpoint of said flight index to obtain maximum endurance aloft.

12. The method as defined in claim 9 further comprising the steps of:
 (a) establishing a wide open throttle climb;
 (b) adjusting the pitch of said aircraft to determine the threshold of sink during the climb;
 (c) placing a third color coded detachably affixable indicia adjacent said indicating means;
 (d) identifying the stall attitude of the aircraft in the climb;
 (e) placing a fourth color coded detachably affixable indicia proximal said stall attitude to define a climb index; and
 (f) adjusting the pitch of the aircraft to maintain the pitch within said climb index near the threshold of sink to establish the best rate of climb.

* * * * *

UNITED STATES PATENT AND TRADEMARK OFFICE
CERTIFICATE OF CORRECTION

PATENT NO. : 5,067,667
DATED : November 26, 1991
INVENTOR(S) : Charles B. Shivers, Jr.

It is certified that error appears in the above-indentified patent and that said Letters Patent is hereby corrected as shown below:

Col. 3, claim 1, line 66, change "descent" to: -ascent-;
line 67, change "ascent" to: -descent-.
Col. 4, claim 1, line 4, change "power off glide" to: -full power ascent-; line 7, change "power off glide" to: -full power ascent-.
Col. 4, claim 2, line 17, change "aviators" to: -aviator's-; line 18 and 19, change "full power ascent" to: -power off glide-; line 21, delete "angle"; after "attitude" insert: -intermediate said third and fourth indicating means-; lines 24 and 25, change "the best rate of climb" to: -a minimum sink profile-.
Col. 5, claim 9, line 2, change "off glide" to: -on ascent-;
line 12, change "off" to: -on-.
Col. 6, claim 12, line 7, change "wide open throttle climb" to: -power off glide-; line 9, change "climb" to: -glide-; line 13, change "climb" to: -glide-; line 15, change "climb" to: -descent-; line 18, change "climb" to: -descent-; line 19, change "rate of climb" to: -glide-.

Signed and Sealed this

First Day of February, 1994

Attest:

BRUCE LEHMAN

Attesting Officer

Commissioner of Patents and Trademarks